(12) United States Patent
Lee

(10) Patent No.: US 10,509,203 B2
(45) Date of Patent: Dec. 17, 2019

(54) IMAGE PICKUP LENS

(71) Applicant: HON HAI PRECISION INDUSTRY CO., LTD., New Taipei (TW)

(72) Inventor: Ming-Lin Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 139 days.

(21) Appl. No.: 15/709,562

(22) Filed: Sep. 20, 2017

(65) Prior Publication Data

US 2019/0056567 A1 Feb. 21, 2019

Related U.S. Application Data

(60) Provisional application No. 62/547,939, filed on Aug. 21, 2017.

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC .. G02B 13/0045; G02B 9/60; G02B 27/0025; G02B 13/18; G02B 5/208; G02B 5/005; G02B 13/002; G02B 13/0015; G02B 13/06; G02B 1/041; G02B 13/04; G02B 3/04; G02B 9/62; G02B 13/004; G02B 9/00; G02B 9/34; G02B 13/00; G02B 13/001; G02B 13/0055; G02B 13/006
See application file for complete search history.

(56) References Cited

U.S. PATENT DOCUMENTS

| 2011/0157722 A1* | 6/2011 | Luo | G02B 13/04 359/713 |
| 2018/0149836 A1* | 5/2018 | Ko | G02B 9/00 |
| 2018/0314038 A1* | 11/2018 | Hsieh | G02B 13/0045 |

FOREIGN PATENT DOCUMENTS

| TW | 201235694 A | 9/2012 |
| TW | 201245758 A | 11/2012 |
| TW | 201814346 A | 4/2018 |
| WO | 2016/003211 A1 | 1/2016 |

* cited by examiner

*Primary Examiner* — Evan P Dzierzynski
*Assistant Examiner* — Sharrief I Broome
(74) *Attorney, Agent, or Firm* — ScienBiziP, P.C.

(57) ABSTRACT

An image pickup lens comprises a first lens having negative refractive power, a second lens having positive refractive power, a third lens having negative refractive power, a fourth lens having positive refractive power, and a fifth lens having negative refractive power, from an object side to an image side. The image pickup lens has an optical axis. A portion of a surface of the first lens facing the object side and close to the axis is convex, a portion of a surface of the first lens facing the image side and close to the axis is concave. A portion of a surface of the fourth lens facing the object side and close to the axis is convex, a portion of a surface of the fourth lens facing the image side and close to the axis is convex. The image pickup lens has large field of view and small volume.

13 Claims, 4 Drawing Sheets

IMAGE PICKUP LENS

FIELD

The subject matter herein generally relates to an image pickup lens.

BACKGROUND

Image pickup lenses are widely used in electronic products. An image pickup lens with small volume, light weight, high resolution, and large Field of View is needed.

BRIEF DESCRIPTION OF THE DRAWINGS

Implementations of the present disclosure will now be described, by way of example only, with reference to the attached figures.

DETAILED DESCRIPTION

Figure 1:
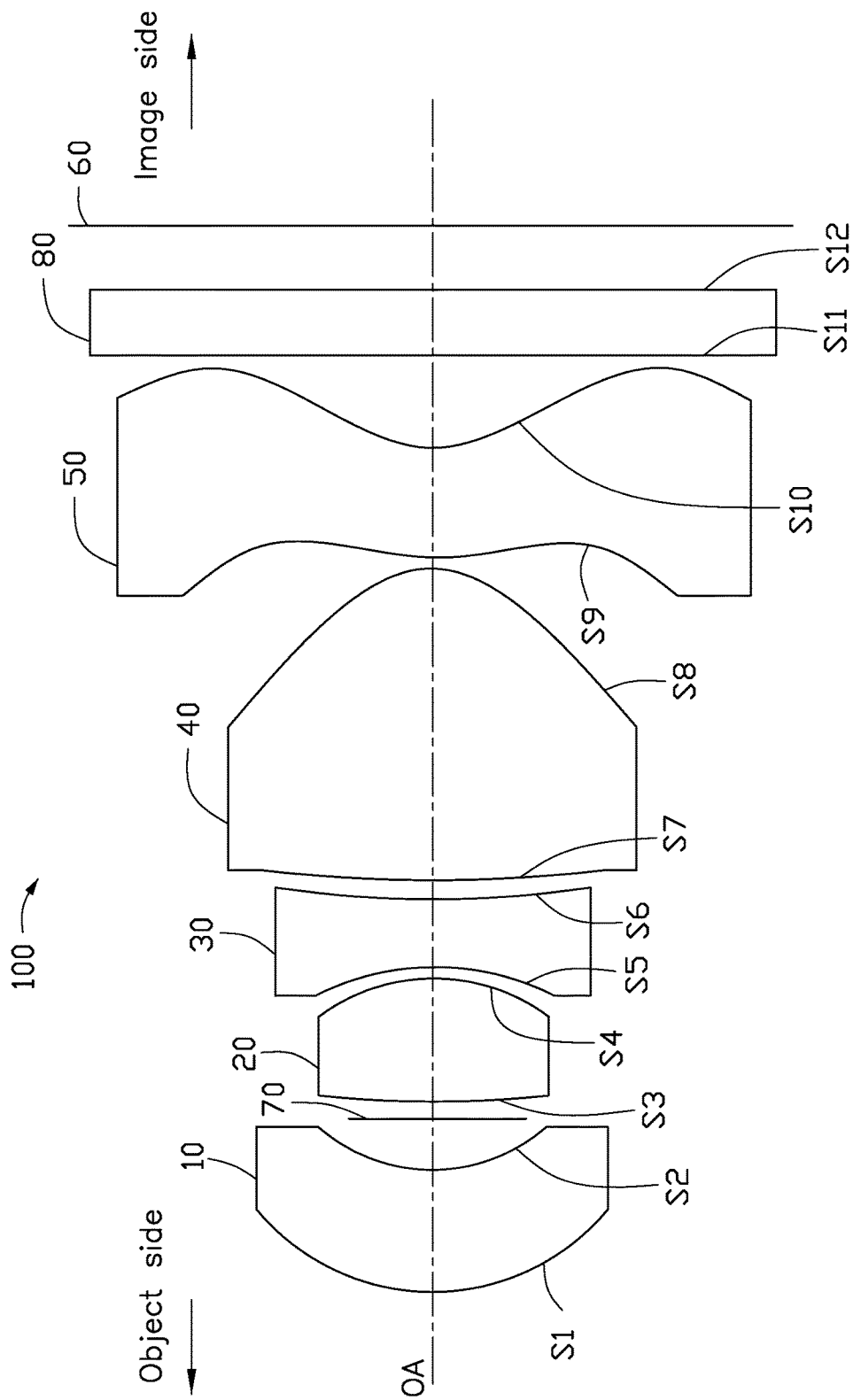
FIG. 1 is a diagram of an exemplary embodiment of an image pickup lens.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIG. 1 illustrates an exemplary embodiment of an image pickup lens 100. The image pickup 100 can be applied in a safety system or an electronic device (such as mobile phone, personal computer, game machine, and camera).

The image pickup lens 100 comprises a first lens 10 having a negative refractive power, a second lens 20 having a positive refractive power, a third lens 30 having a negative refractive power, a fourth lens 40 having a positive refractive power, a fifth lens 50 having a negative refractive power, and an imaging plane 60. The first lens 10, the second lens 20, the third lens 30, the fourth lens 40, the fifth lens 50, and the imaging plane 60 are arranged in that sequence from an object side to an image side of the image pickup lens 100, as shown in FIG. 1.

The first lens 10, the second lens 20, the third lens 30, the fourth lens 40, and the fifth lens 50 have a same optical axis OA.

The image pickup lens 100 further comprises an aperture 70. The aperture 70 is arranged between image side of the first lens 10 and the object side of the second lens 20, thereby the image pickup lens 100 can have a large field of view (FOV).

The first lens 10 comprises a first surface S1 facing the object side, and a second surface S2 facing the image side. A portion of the first surface S1 close to where the optical axis OA passes through is a convex surface, a portion of the second surface S2 close to where the optical axis OA passes through is a concave surface. The first lens 10 has a negative refractive power, and the portion of the first surface S1 close to where the optical axis OA passes through is a convex surface, the portion of the second surface S2 close to where the optical axis OA passes through is a concave surface. Thus the image pickup lens 100 can have a large field of view.

The second lens 20 comprises a third surface S3 facing the object side, and a fourth surface S4 facing the image side. The fourth surface S4 is a convex surface. The second lens 20 has a positive refractive power, and being located behind the first lens 10 having a negative refractive power, thus the image pickup lens 100 can have a short length, thus the image pickup lens 100 can have a small volume.

The third lens 30 comprises a fifth surface S5 facing the object side, and a sixth surface S6 facing the image side. A portion of the fifth surface S5 close to where the optical axis OA passes through is a concave surface, a portion of the sixth surface S6 close to where the optical axis OA passes through is a concave surface, a portion of the sixth surface S6 away from where the optical axis OA passes through is a concave surface. Both the portion of the sixth surface S6 close to where the optical axis OA passes through and the portion of the sixth surface S6 away from where the optical axis OA passes through are concave surface, thus can reduce the astigmatism, coma, and spherical aberration caused by the concave surface of the fifth surface S5.

The fourth lens 40 comprises a seventh surface S7 facing the object side, and an eighth surface S8 facing the image side. A portion of the seventh surface S7 close to where the optical axis OA passes through is a convex surface, and has a weak surface power, thus can suppress the off-axis aberration formed by the seventh surface S7. A portion of the eighth surface S8 close to where the optical axis OA passes through is a convex surface. A center thickness of the fourth lens 40 is the larger than a center thickness of the first lens 10, a center thickness of the second lens 20, a center thickness of the third lens 30, and a center thickness of the fifth lens 50, in other words, a center thickness of the fourth lens 40 is the largest in the five lens of the image pickup lens 100, thus the fourth lens 40 can share diopter of the second lens 20, and reduce the sensitivity of the image pickup lens 100. The image pickup lens 100 is easy to be assembled and manufactured.

The fifth lens 50 comprises a ninth surface S9 facing the object side, and a tenth surface S10 facing the image side. A portion of the tenth surface S10 close to where the optical axis OA passes through, is a concave surface, a portion of the tenth surface S10 away from where the optical axis OA passes through is a convex surface. At least one of the ninth surface S9 and the tenth surface S10 is an aspherical surface, in other words, the fifth lens 50 is an aspherical lens, to increase degree of freedom in design stage, and to reduce optical aberrations of the image pickup lens 100. The portion of the tenth surface S10 away from where the optical axis OA passes through is a convex surface, thus can reduce distortion and astigmatism of large field of view.

The aspherical surface satisfies the following formula:

$$Z(y) = \frac{h^2/R}{1+\sqrt{1-(1+K)(h/R)^2}} + Ah^4 + Bh^6 + Ch^8 + Dh^{10} + Eh^{12} + Fh^{14} + Gh^{16},$$

where Z denotes an aspherical surface sag of each surface; R denotes a radius of curvature; h denotes a radial distance of the surface from the optical axis; K denotes a conic constant; and A, B, C, D, E, F, and G denote aspherical coefficients of each surface.

The fifth lens 50 is made of plastic. A refractive index of the fifth lens 50 is greater than 1.58 to have a more moderate shape of the fifth lens 50 and facilitate molding of it.

To reduce sensitivity of the image pickup lens 100, the image pickup lens 100 satisfies the following formula:

$$1.6 < f_2/f_4 < 3.2,$$

where $f_2$ denotes a focal distance of the second lens 20, and $f_4$ denotes a focal distance of the fourth lens 40.

To reduce the total length of the image pickup lens 100 and to reduce the volume of the image pickup lens 100, the image pickup lens 100 further satisfies the following formula:

$$-1.1 < f_{1-4}/f_5 < -0.63,$$

where the $f_{1-4}$ denotes a focal length from an object side surface of the first lens 10 to an image side surface of the fourth lens 40. The $f_5$ denotes a focal length of the fifth lens 50.

To have the image pickup lens 100 obtain a balance in reducing aberrations, reducing total length, and reducing sensitivity, the image pickup lens 100 further satisfies the following formula:

$$0.44 < f_4/f < 0.6,$$

where the $f_4$ denotes a focal length of the fourth lens 40. The f denotes focal length of the image pickup lens 100.

When the $f_4/f \geq 0.6$, the total length of the image pickup lens will be too long. When the $f_4/f \leq 0.44$, the fourth lens 40 will be hard to manufacture, and aberrations is hard to eliminated.

To further reduce sensitivity of the image pickup lens 100, the image pickup lens 100 further satisfies the following formula:

$$1.5 < f_3/f_5 < 4,$$

where the $f_3$ denotes a focal length of the third lens 30, and the $f_5$ denotes a focal length of fifth lens 50.

To eliminate chromatic aberration of the image pickup lens 100, the image pickup lens 100 further satisfies the following formula:

$$V_1 < 30, V_3 < 30, V_5 < 30,$$

where the $V_1$ denotes a dispersion coefficient of the first lens 10, the $V_3$ denotes a dispersion coefficient of the third lens 30, and the $V_5$ denotes a dispersion coefficient of the fifth lens 50.

The image pickup lens 100 further satisfies the following formula:

$$1[1/\mu m] < Fno/P[\mu m] < 2[1/\mu m],$$

where the Fno denotes a relative aperture of the image pickup lens 100, and the P denotes a pixel size of an applied sensor of the image pickup lens 100, a unit of the P is μm.

When the Fno/P≥2, the incoming light energy of the image pickup lens 100 will be weak. When the Fno/P≤1, pixels will become too big or the aperture 70 will be too big to control the aberrations of the image pickup lens 100. Either way is hard to practice real performance of this optical structure of the image pickup lens 100.

The image pickup lens 100 further satisfies the following formula:

$$-0.5 < \Phi o/\Phi p < 0.3,$$

where Φp denotes a refractive power of the fifth lens 50 close to where the optical axis OA passes through, and Φo denotes a refractive power of the fifth lens 50 for the maximum effective diameter area. Φo is calculated by the formula: Φo=tan ζ/Ho, wherein Ho denotes the maximum effective diameter of the fifth lens 50, and ζ denotes a deflection angle. The deflection angle is obtained by parallel light coming from infinity of the object side, arriving at the maximum effective diameter area (Do of the fifth lens 50, and being deflected by the fifth lens 50. The parallel light passing over the maximum effective diameter area of the fifth lens 50 is deflected light. When a crossover point of the deflected light and the optical axis OA is at the image side of the fifth lens 50, the ζ is positive. When a crossover point of the deflected light and the optical axis OA is at the object side of the fifth lens 50, the ζ is negative. When Φo/Φp≥0.3, a chief ray angle of the largest FOV will be too big, thus dimming the area around the outer area of image. When Φo/Φp≤-0.5, aberrations of the image pickup lens 100 will be difficult to control.

The image pickup lens 100 further comprises a filter 80. The filter 80 is arranged between the fifth lens 50 and the imaging plane 60. The filter 80 filters out non-visible light. The filter may be a low pass filter, an infrared cut-off filter, or the like. The filter 80 comprises an eleventh surface S11 facing the object side, and a twelfth surface S12 facing the image side.

In at least one exemplary embodiment, a radius of curvature "R" of each surface, a distance "d" in an optical axis between two adjacent surfaces, a refractive index "Nd" of each lens, and an Abbe number "Vd" of each lens are shown in Table 1.

TABLE 1

| Surface | R (mm) | d (mm) | Nd | Vd |
| --- | --- | --- | --- | --- |
| S1 | 1.861 | 0.383 | 1.635 | 23.9 |
| S2 | 1.459 | 0.222 | — | — |
| Aperture 70 | Infinity | −0.011 | — | — |
| S3 | 3.105 | 0.377 | 1.544 | 56.1 |
| S4 | −1.590 | 0.037 | — | — |
| S5 | −3.076 | 0.222 | 1.583 | 29.9 |
| S6 | 2.754 | 0.048 | — | — |
| S7 | 8.509 | 0.978 | 1.544 | 56.1 |
| S8 | −0.460 | 0.036 | — | — |
| S9 | 1.919 | 0.343 | 1.636 | 23.9 |
| S10 | 0.457 | 0.276 | — | — |
| S11 | Infinity | 0.21 | 1.517 | 64.1 |
| S12 | Infinity | 0.352 | — | — |
| Imaging plane | Infinity | — | — | — |

In at least one exemplary embodiment, the conic constant K, and the aspherical coefficients A, B, C, D, E, F, and G are shown in Table 2.

TABLE 2

| Surface | K | A | B | C | D | E | F | G |
|---|---|---|---|---|---|---|---|---|
| S1 | 1.742069 | 0.22376506 | 0.14692532 | −0.12285493 | 0.21337963 | 0.52381294 | 0.84717319 | −1.7157876 |
| S2 | 7.220033 | 0.56438952 | −1.1989029 | 6.0100645 | −0.0147582 | 20.870057 | −225.92306 | 0 |
| S3 | 0 | −0.0539270 | 2.6883002 | −26.580588 | 57.358851 | 494.66743 | −2457.4169 | 0 |
| S4 | 8.263497 | −0.33700365 | 0.043363766 | 3.4667315 | 9.4202006 | −55.398174 | −75.943653 | 1152.2042 |
| S5 | 29.80445 | −0.89647309 | 1.5614229 | 0.74450083 | −7.3656079 | 6.5461045 | 101.85775 | 0 |
| S6 | 0 | −0.44760751 | 0.61328961 | −0.66066655 | −1.5284469 | 3.1646031 | 9.4974141 | −16.628407 |
| S7 | 0 | 0.064852621 | −0.31997051 | −0.21038379 | 2.0407319 | 0.43469833 | −3.0053178 | −0.0654465 |
| S8 | −3.262759 | −0.57339933 | 0.69839798 | −0.67376505 | 0.41872019 | −0.15292333 | 0.20942853 | 0.48089992 |
| S9 | 0 | −0.483432 | 0.12582471 | −0.0551326 | −0.0153774 | 0.043141293 | 0 | 0 |
| S10 | −4.780612 | −0.21220601 | 0.078478579 | −0.0274900 | 0.00357652 | 0 | 0 | 0 |

In at least one exemplary embodiment, an effective focal length "EFL", an F-number "Fno", and a field of view angle "FOV(2□)" of the image pickup lens 100 in one exemplary embodiment are shown in Table 3.

TABLE 3

| EFL | Fno | FOV (2□) |
|---|---|---|
| 1.59 | 2.0 | 86.9 |

Data of the above conditions in one exemplary embodiment are shown in Table 4.

TABLE 4

| $f_2/f_4$ | $f_{1-4}/f_5$ | $f_4/f$ | $V_1$ | $V_3$ | $V_5$ | $\Phi o/\Phi p$ | $f_3/f_5$ | Fno/P[μm] |
|---|---|---|---|---|---|---|---|---|
| 2.38 | −0.93 | 0.523 | 23.9 | 29.9 | 23.9 | 0.168 | 2.37 | 1.42 |

Figure 2:
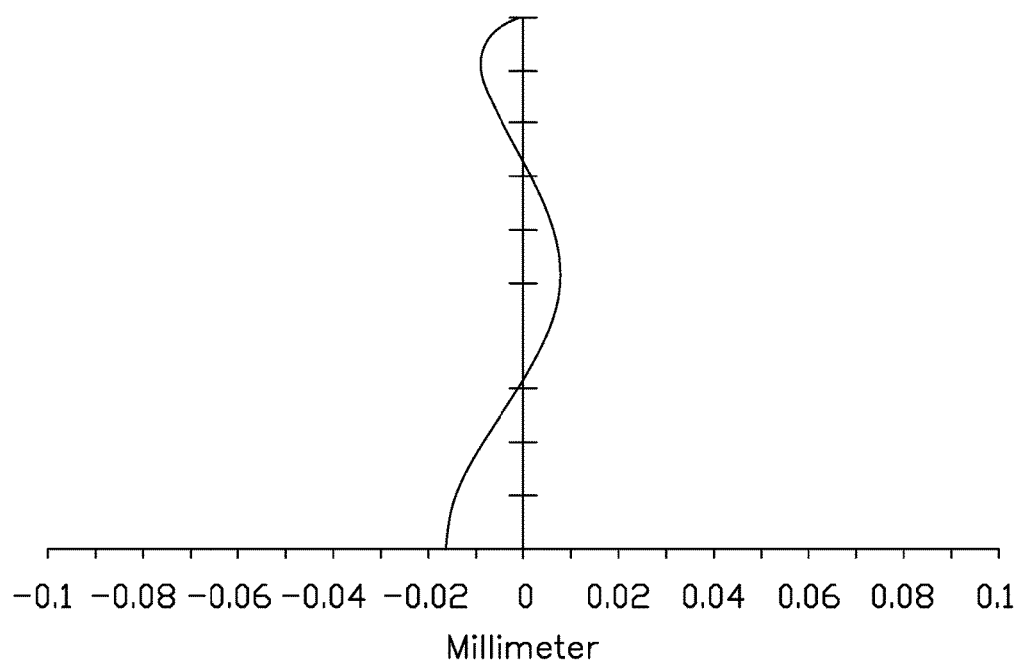
FIG. 2 depicts a longitudinal aberration diagram of the image pickup lens of FIG. 1, in a wavelength of 587 nm.

In at least one exemplary embodiment, a longitudinal aberration diagram of an exemplary embodiment of the wide-angle lens 100 in a wavelength of 587 nm is shown in FIG. 2, vertical axis is a relative field numeric.

Figure 3:
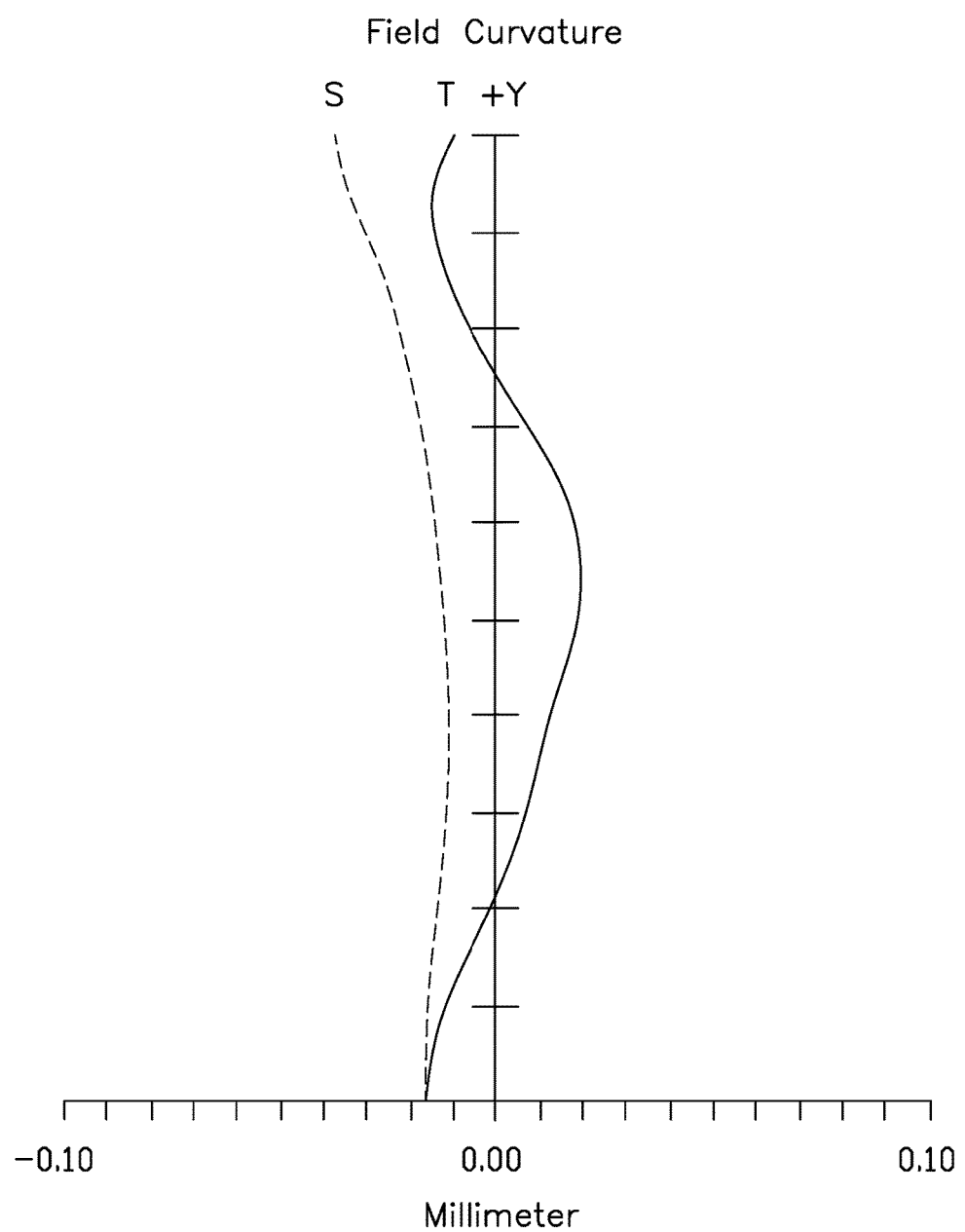
FIG. 3 is a field curvature diagram of the image pickup lens of FIG. 1, in a wavelength of 587 nm.

In at least one exemplary embodiment, a field curvature diagram of an exemplary embodiment of the wide-angle lens 100 in a wavelength of 587 nm is shown in FIG. 3, vertical axis is a relative field numeric.

Figure 4:
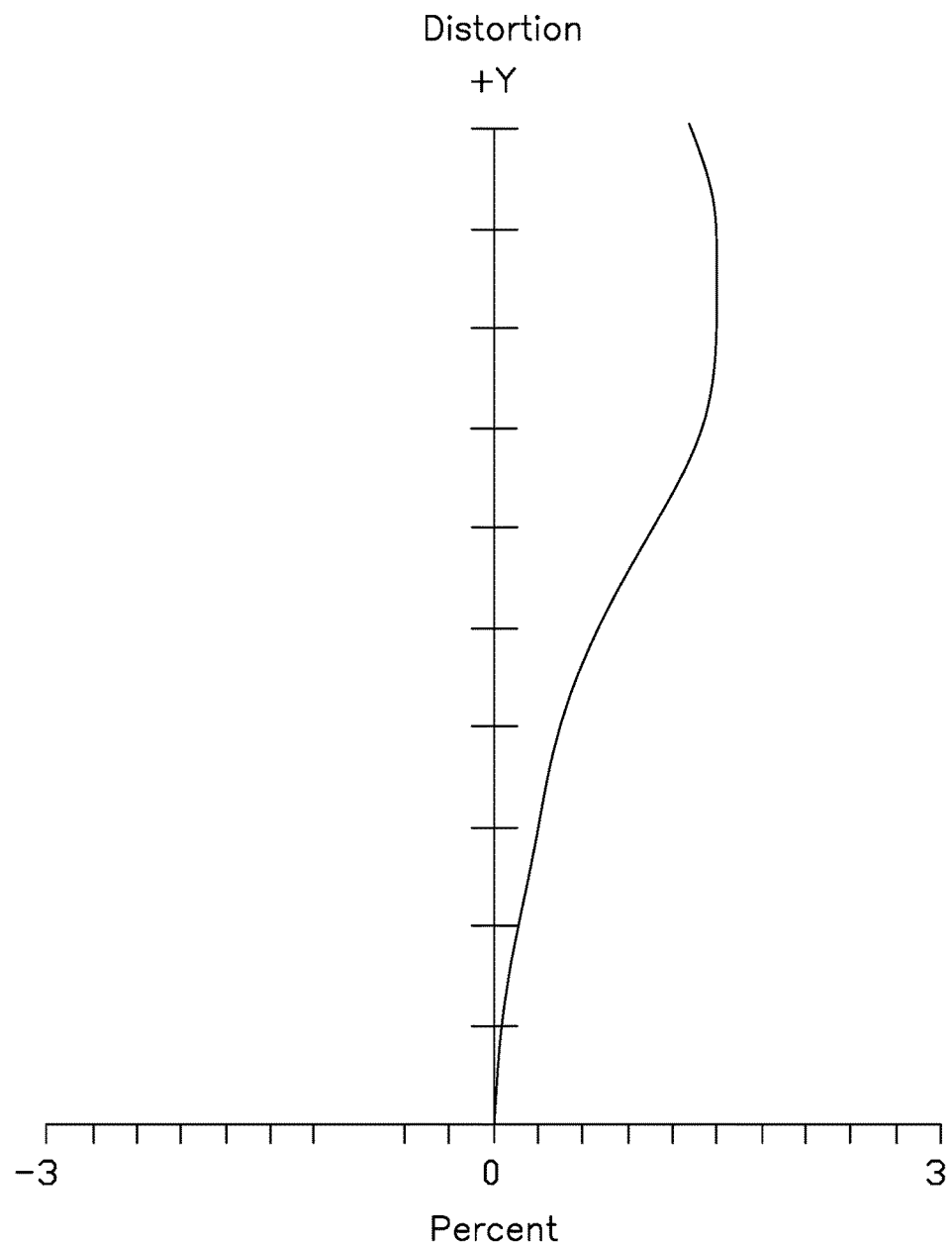
FIG. 4 is a distortion diagram (f*tan θ) of the image pickup lens of FIG. 1, in a wavelength of 587 nm.

In at least one exemplary embodiment, a distortion diagram of an exemplary embodiment of the wide-angle lens 100 in a wavelength of 587 nm is shown in FIG. 4, vertical axis is a relative field numeric.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An image pickup lens comprising:
a first lens having a negative refractive power;
a second lens having a positive refractive power;
a third lens having a negative refractive power;
a fourth lens having a positive refractive power;
a fifth lens having a negative refractive power; and
an imaging plane;
wherein the first lens, the second lens, the third lens, the fourth lens, the fifth lens, and the imaging plane are arranged in that sequence from an object side to an image side of the image pickup lens, the first lens, the second lens, the third lens, the fourth lens, and the fifth lens have a same optical axis;
wherein, the first lens comprises a first surface facing the object side, and a second surface facing the image side, a portion of the first surface close to where the optical axis passes through is a convex surface, a portion of the second surface close to where the optical axis passes through is a concave surface;
wherein, the fourth lens comprises a seventh surface facing the object side, and an eighth surface facing the image side, a portion of the seventh surface close to where the optical axis passes through is a convex surface, a portion of the eighth surface close to where the optical axis passes through is a convex surface;
wherein, the fifth lens comprises a ninth surface facing the object side, and a tenth surface facing the image side, at least one of the ninth surface and the tenth surface is an aspherical surface;
wherein the image pickup lens satisfies the following formula:

$$1.6 < f_2/f_4 < 3.2,$$

where $f_2$ denotes a focal distance of the second lens, and $f_4$ denotes a focal distance of the fourth lens.

2. The image pickup lens of claim 1, wherein the second lens comprises a fourth surface facing the image side, the fourth surface is a convex surface.

3. The image pickup lens of claim 1, wherein the third lens comprises a fifth surface facing the object side, and a sixth surface facing the image side, a portion of the fifth surface close to where the optical axis passes through is a concave surface, a portion of the sixth surface close to where the optical axis passes through is a concave surface, a portion of the sixth surface away from the optical axis is a concave surface.

4. The image pickup lens of claim 1, wherein the fifth lens comprises a tenth surface facing the image side, a portion of the tenth surface close to where the optical axis passes through is a concave surface, a portion of the tenth surface away from the optical axis is a convex surface.

5. The image pickup lens of claim 1, wherein the fifth lens is made of plastic.

6. The image pickup lens of claim 1, wherein a refractive index of the fifth lens is greater than 1.58.

7. The image pickup lens of claim 1, wherein the image pickup lens further satisfies the following formula:

$$-1.1 < f_{1-4}/f_5 < -0.63,$$

where the $f_{1-4}$ denotes a focal length from an object side surface of the first lens to an image side surface of the fourth lens, the $f_5$ denotes a focal length of the fifth lens.

8. The image pickup lens of claim 1, wherein the image pickup lens further satisfies the following formula:

$$0.44 < f_4/f < 0.6,$$

where the $f_4$ denotes a focal length of the fourth lens, the f denotes focal length of the image pickup lens.

9. The image pickup lens of claim 1, wherein the image pickup lens further satisfies the following formula:

$$1.5 < f_3/f_5 < 4,$$

where the $f_3$ denotes a focal length of the third lens, and the $f_5$ denotes a focal length of fifth lens.

10. The image pickup lens of claim 1, wherein the image pickup lens further satisfies the following formula:

$$V_1 < 30, V_3 < 30, V_5 < 30,$$

where the $V_1$ denotes a dispersion coefficient of the first lens, the $V_3$ denotes a dispersion coefficient of the third lens, and the $V_5$ denotes a dispersion coefficient of the fifth lens.

11. The image pickup lens of claim 1, wherein the image pickup lens further satisfies the following formula:

$$-0.5 < \Phi o/\Phi p < 0.3,$$

where $\Phi p$ denotes a refractive power of the fifth lens close to where the optical axis passes through, and $\Phi o$ denotes a refractive power of the fifth lens for the maximum effective diameter area, $\Phi o$ is calculated by formula: $\Phi o = \tan \zeta / Ho$, wherein Ho denotes the maximum effective diameter of the fifth lens, and $\zeta$ denotes a deflection angle, the deflection angle is obtained by parallel light coming from infinity of the object side, arriving at the maximum effective diameter area $\Phi o$ of the fifth lens, and being deflected by the fifth lens, the parallel light passing over the maximum effective diameter area of the fifth lens is deflected light, when a crossover point of the deflected light and the optical axis is at the image side of the fifth lens, the $\zeta$ is positive, when a crossover point of the deflected light and the optical axis is at the object side of the fifth lens, the $\zeta$ is negative.

12. The image pickup lens of claim 1, wherein the image pickup lens further comprises an aperture, the aperture is arranged between image side of the first lens and the object side of the second lens.

13. The image pickup lens of claim 1, wherein a center thickness of the fourth lens is the larger than a center thickness of the first lens, a center thickness of the second lens, a center thickness of the third lens, and a center thickness of the fifth lens.

* * * * *